Jan. 18, 1949.  A. L. McKINNON  2,459,735
METHOD OF MANUFACTURE OF SNAP HOOKS
Filed Feb. 5, 1945  3 Sheets-Sheet 1
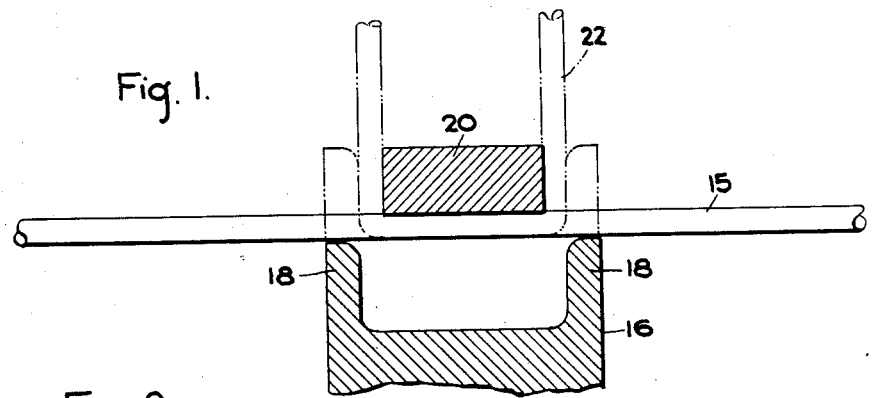
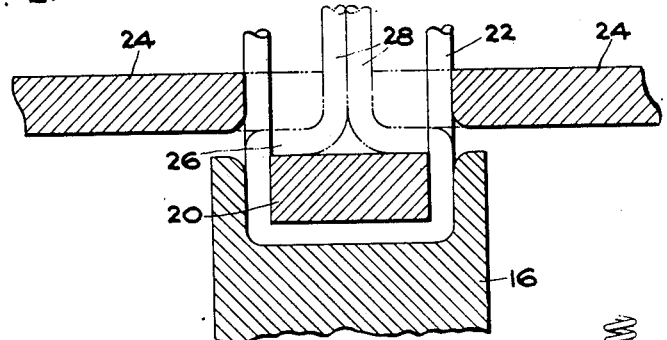
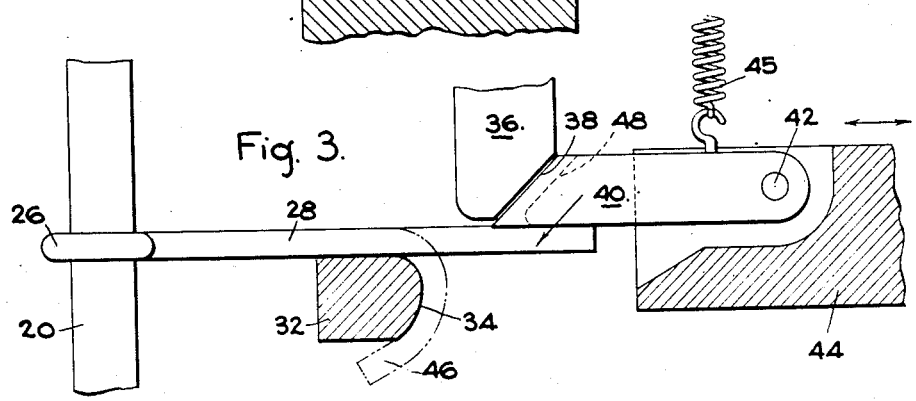
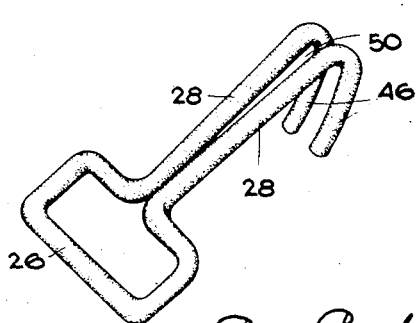
INVENTOR
ARCHIBALD L. McKINNON
BY
Bean, Brooks, Buckley & Bean, ATTORNEYS Jan. 18, 1949.  A. L. McKINNON  2,459,735
METHOD OF MANUFACTURE OF SNAP HOOKS
Filed Feb 5, 1945  3 Sheets-Sheet 2
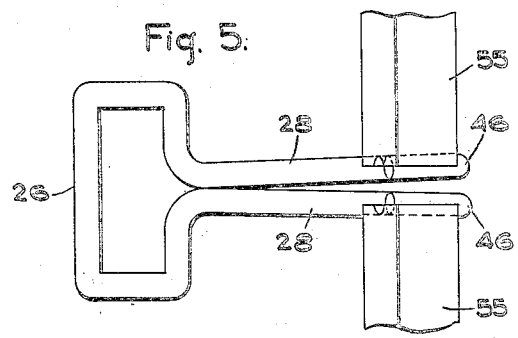
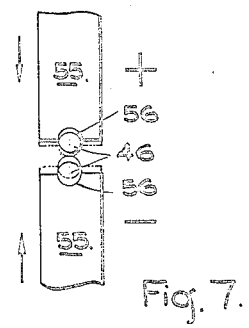
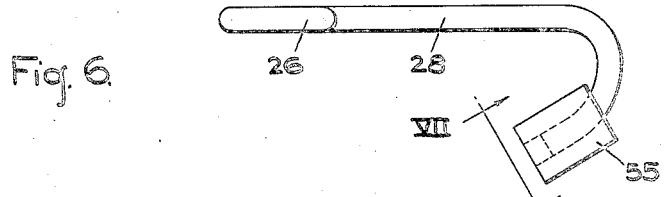
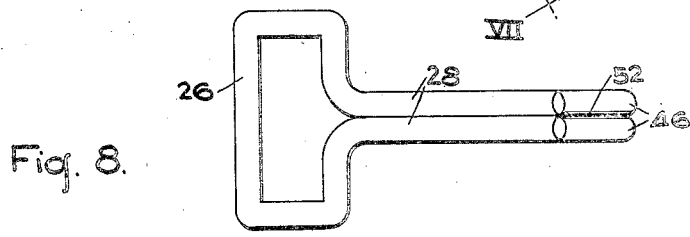
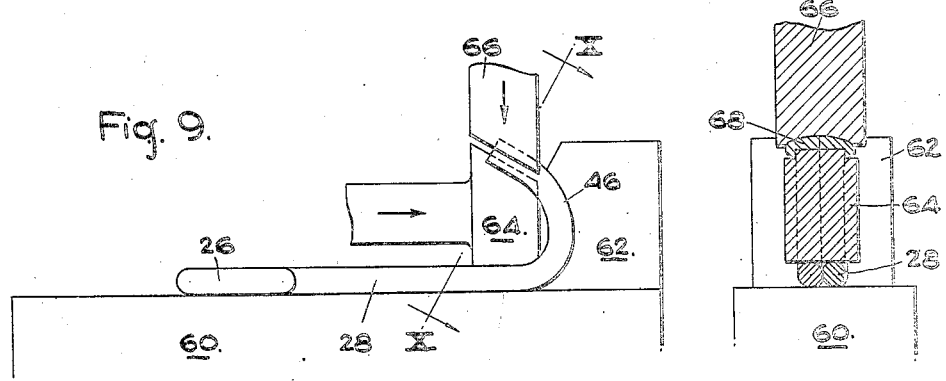
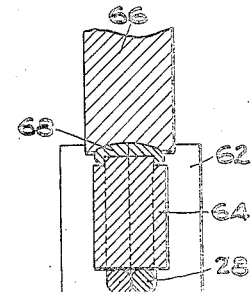
INVENTOR
ARCHIBALD L. McKINNON
BY
Bean, Brooks, Buckley & Bean ATTORNEYS Jan. 18, 1949.   A. L. McKINNON   2,459,735
METHOD OF MANUFACTURE OF SNAP HOOKS Filed Feb. 5, 1945   3 Sheets-Sheet 3

INVENTOR
ARCHIBALD L. McKINNON
BY
Bean, Brooks, Buckley & Bean ATTORNEYS

Patented Jan. 18, 1949

2,459,735

UNITED STATES PATENT OFFICE 2,459,735

METHOD OF MANUFACTURE OF SNAP HOOKS

Archibald L. McKinnon, St. Catharines, Ontario, Canada, assignor to Columbus McKinnon Chain Corporation, Tonawanda, N. Y.

Application February 5, 1945, Serial No. 576,293

5 Claims. (Cl. 29—148)

This invention relates to improvements in "snap" hook devices, and to improved methods for manufacturing like articles.

One of the objects of the invention is to provide an improved snap hook of the type formed of bent rod or wire stock, and having advantages of increased ruggedness and stability against load failures compared to prior snap hooks of generally similar type. Another object of the invention is to provide an improved snap hook design which is adapted to be fabricated in improved manner by automatic and semi-automatic methods and machines. Another object of the invention is to comprise an improved snap hook of the character described which is to be adapted to be manufactured with improved facility by mass production methods and at lesser cost compared to snap hooks of the prior art.

Another object of the invention is to provide improved methods for fabricating snap hook devices of the character referred to hereinabove. Other objects and advantages of the invention will appear in the specification hereinafter.

In the drawings:

Fig. 1 is a fragmentary diagrammatic view of an initial stock piece forming operation of the method of the invention;

Fig. 2 is a diagrammatic illustration similar to Fig. 1 of a succeeding operation of the method of the invention;

Fig. 3 is a fragmentary diagrammatic illustration of a step of the method of the invention following the operation illustrated by Fig. 2;

Fig. 4 is a perspective of a partially formed hook element resulting from the operations of Figs. 1-3 inclusive;

Fig. 5 illustrates in plan view preparation for the manufacturing operation for further processing the partially formed hook of Fig. 4;

Fig. 6 is a side elevation corresponding to Fig. 5;

Fig. 7 is a view taken along line VII—VII of Fig. 6, illustrating application of a welding process to the partially completed hook device;

Fig. 8 is a plan view of a welded hook device upon completion of the operation illustrated by Figs. 5-7 inclusive;

Fig. 9 is a fragmentary diagrammatic view showing in side elevation the partially completed hook device of Fig. 8 in process of being further shaped towards its completed form;

Fig. 10 is a section taken along line X—X of Fig. 9;

Figure 11:
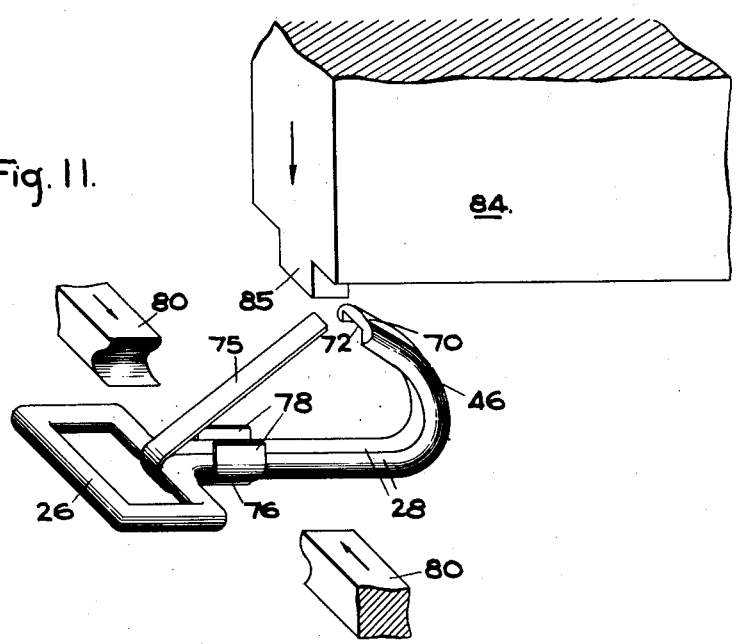
Fig. 11 is a fragmentary diagrammatic view in perspective showing the hook device following the process illustrated by Figs. 9-10 and in preparation for performance thereon of a final assembly and fabricating operation.

As illustrated in the drawing, the invention relates to methods and means for producing in large quantities snap hook devices of the type comprising wire or rod stock which has been initially cut to standard lengths and then bent so as to form a hook device comprising side-by-side leg portions terminating in an eye-shaped end for connection to a harness strap or the like. A leaf spring guard is separately fabricated and mounted upon the hook body in conjunction with the operation of finally shaping the latter, so as to comprise an integrally assembled unit of improved form.

For example, Fig. 1 of the drawing illustrates at 15 a length of wire stock such as may have been previously cut to suitable length from either coiled wire or rod stock and then brought to rest in centered operative position as shown in Fig. 1 upon a forming die 16. The die 16 is provided with a pair of parallel abutments 18—18 which extend from the body of the die and are rounded at their inner corners whereby the die 16 may be powered to force the stock piece 15 to bend around a ram block 20, the stock piece 15 being thereby displaced into the space between the die abutments 18—18 so as to be initially bent into a U-shape as indicated at 22. While the die and block devices are maintained so as to hold the bent stock piece in position interiorly of the die 16, a pair of rams 24—24 are brought to bear laterally against the upstanding leg portions of the stock piece to converge thereupon so as to deform the legs inwardly and against one another so as to complete the formation of an eye-shaped portion 26 and to dispose the legs of the stock piece in side-by-side extending relation as indicated at 28—28 (Fig. 2).

The partially formed hook is thereupon supported upon a pedestal 32 having a downwardly rounded nose 34 (Fig. 3). A cam block 36 is stationarily mounted above the position of the extending legs of the partially formed hook and ahead of the pedestal 32 and in the path of motion of an inclined end portion 38 of a ram 40 which is pivotally mounted by means of a bearing 42 upon a traveler 44 which is adapted to be power driven to reciprocate in directions horizontally as viewed in Fig. 3. A tension spring 45 connects to the ram 40 ahead of the pivot connection 42 so as to normally maintain the ram in the horizontal attitude thereof as shown in Fig. 3. However, upon motion of the traveler to the left as viewed in Fig. 3, it will be understood that the sloping end 38 of the ram 40 will be deflected obliquely downwardly by the cam 36, whereby the leading end portion of the ram 40 will bear initially downwardly and then rearwardly against the ends of the hook legs 28 so as to curl the latter downwardly and thence rearwardly into the deformed shapes thereof indicated at 46 in Fig. 3. The leading end of the ram 40 is grooved as indicated at 48 so as to receive the hook legs 28—28 in guided relation therein during the hook end forming operation. Thus, the hook stock piece is formed into the shape illustrated by Fig. 4; and particular attention is called to the fact that due to the natural resiliency of the metal of the stock piece there is an inevitable tendency for the legs 28—28 to spread slightly when released from the die and ram devices, thus providing a gap between the hook end portions of the legs as indicated a 50 in Fig. 4.

Figs. 5-6-7 diagrammatically illustrate performance of the next step of the method of the invention wherein the ends of the legs of the hook device are pressed together and then welded as indicated at 52 in Fig. 8 to comprise an integral structure. This is accomplished by placing the leg ends between a pair of converging electrodes 55—55 which are grooved as indicated at 56 so as to accurately engage upon the hook legs in firmly anchored relation prior to exerting thereagainst leg-converging pressures.

As the electrodes 55—55 are progressively displaced toward one another so as to spring the hook legs toward contacting relation the electrode current flows around through the entire hook formation to complete the circuit between the electrodes, and the resistance of the hook stock to such current flow results in a preliminary heating of the stock. At the time of direct contact between the hook ends, however, the electrode current passes almost entirely directly through the contact between the leg ends. The former flow of current around through the entire hook body is thereby short circuited and the pressure exerted by the converging electrodes combines with the heat thereby developed to cause the hook ends to be welded together. The current is then cut off to permit the welded connection to cool slightly, whereupon the electrodes are retracted, leaving the welded hook in the form illustrated by Fig. 8. As the residual heat dissipates from the body of the formed hook it provides a stress relief effect in the hook body and leg portions. Thus, the initial electrical heating of the hook body and leg portions prior to welding contact between the ends of the legs complements the heating effects of the welding operation and the residual heat subsequent thereto such as to provide overall a more satisfactory product.

As illustrated by Figs. 9-10 the next step of the method of the operation comprises forging of the welded portion of the hook end into such shape as to provide an improved cap shape for the spring guard to be subsequently assembled upon the hook body. As shown in the drawing, this step of the method of the operation may be performed by resting the hook upon a base 60 while setting the curved hook end portion 46—46 thereof against a bolster 62 carried integral with the base 60. An inner die 64 is set interiorly of the hook and an upper die 66 is rammed downwardly against the top end surfaces of the welded hook end, whereby the dies 64—66 cooperate to forge the welded end portion of the hook therebetween into the sectional shape thereof shown at 68 in Fig. 10. Thus, the hook end is formed with a smoothly rounded outer surface as indicated at 70 in Fig. 11 and a grooved inner surface as indicated at 72 in Fig. 11, whereby to be adapted to receive therein the free end of a guard device such as is designated generally at 75 in Fig. 11.

Figure 13:
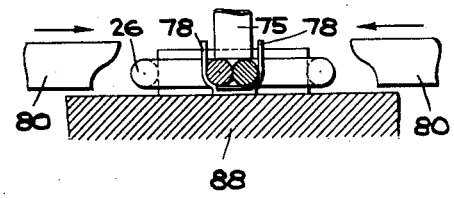
Fig. 13 is a section taken along line XIII—XIII of Fig. 12.

The spring guard device 75 will have been previously fabricated to the form thereof shown in Fig. 11 whereby to comprise a leaf spring body having at one end a reversely bent back portion 76. A collar device 78 is provided to encircle the back 76 of the guard and the leg portions 28—28 of the hook body so as to hold the spring guard in operative position thereon as shown in the assembled view at Fig. 14. Referring again to Fig. 11, particular attention is called to the fact that the hook forming operations prior to this final assembly step of the method of the invention is particularly designed to avoid closing of the hook end portion to the final position thereof so as to enable the operator to slip-fit the guard piece 75 into position upon the hook body as illustrated in Fig. 11 without interference between the free end of the guard 75 and the curved end of the hook. A pair of rams 80—80 are then brought to converge from opposite sides of the hook upon the ears 78—78 of the guard so as to press the latter over and around the hook body and to thereby firmly clamp the guard thereon, as shown at 82 in Fig. 14. Fig. 13 illustrates, in side elevation, operation of the ram devices 80—80 for clamping the ears 78—78 of the guard spring 75 upon the body of the hook.

Figure 12:
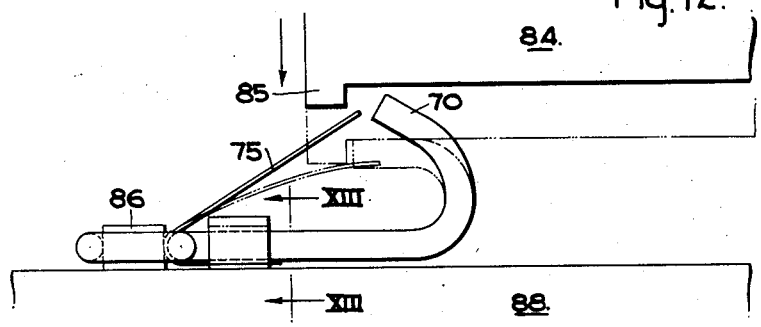
Fig. 12 is a side elevation corresponding to Fig. 11.
Figure 14:
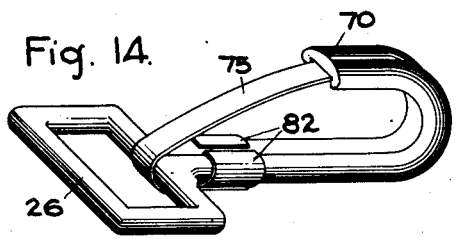
Fig. 14 is a perspective of a completed snap hook of the invention.

A press 84 is thereupon brought to bear downwardly (Fig. 11) against the guard and hook end portions so as to interfit these parts and simultaneously bend the hook end into its final hook shape whereby to prevent subsequent disengagement of the guard from the hook end. For this purpose, as shown in Figs. 11-12, the press 84 is provided with a leading abutment 85 which engages only the guard spring 75 so as to initially press the latter down so that when the body of the press 84 engages the end 70 of the hook to depress the latter into finally closed position, the hook end will slip over the guard spring 75 as shown in Fig. 14. A bolster 86 is preferably provided for this latter operation to engage within the eye portion 26 of the hook device so as to positively position the latter relative to a base plate 88 which opposes the press block 84.

Thus, it will be appreciated that the method of the invention is particularly adapted to full use of automatic type machines and shop practices for rapid production of snap hook and like devices in large quantities; and that the hooks produced thereby are of improved strength characteristics compared to prior art hooks made from similar stock and to similar dimensions. It will be understood that whereas the invention has been illustrated and described hereinabove in exemplification only, various changes may be made therein without departing from the spirit of the invention and the scope of the appended claims.

I claim:

1. The method of forming a hook from wire-like stock comprising cutting a length of stock, then cold bending the latter into U-shape by ramming it intermediately of its ends between a concave die and a press block, then cold pressing the extending leg portions of the stock inwardly and around the press block to form the legs to extend outwardly in substantially side-by-side relation having their inner ends substantially in contact and their outer ends slightly spread apart then cold-bending the outer spread ends of the legs reversely to provide a pair of hooked leg formations, then forcing the spread ends of the legs into firm mutual contact by means of a pair of opposed electrodes and then applying an electric current to said electrodes thereby welding the hooked leg ends together while providing beneficial heat treatment of the cold-bent portions of the stock.

2. The method of forming a hook from wire-like stock comprising cutting a length of stock, then cold bending the latter into U-shape by ramming it intermediately of its ends between a concave die and a press block, then clod pressing the extending leg portions of the stock inwardly and around the press block into self-abutting relation to form the legs to extend in substantially side-by-side but slightly diverging relation, then cold-bending the leg ends reversely to provide a pair of hooked leg formations, then pressing a pair of opposed electrodes against said hooked leg ends so as to squeeze them together while directing an electric current to flow between said electrodes thereby welding the hooked leg ends together while providing beneficial heat treatment of the cold-bent portions of the stock, then forging the welded end portion of the formed hook to provide a groove along the inner surface thereof, and then mounting upon said formed hook a hook guard device comprising a leaf spring cantilever mounted at one end upon said hook with the opposite end of said guard spring disposed to rest within said grooved hook portion.

3. The method of forming a hook comprising cutting a length of stock, then cold bending the latter generally into U-shape and then finally into return bend hook form with the extending leg portions of the stock arranged in substantially side-by-side relation but diverging from their inner ends outwardly then forcing the diverging legs into firm mutual contact by means of a pair of opposed electrodes, and then directing an electric current flow between said electrodes thereby welding the leg ends together while providing beneficial heat treatment of the cold-bent portions of the stock.

4. The method of forming a hook from wire-like stock comprising cutting a length of stock and then bending the latter into U-shape by ramming it intermediately of its ends between a concave die and a press block, then cold pressing the extending leg portions of the stock inwardly and around the press block into self-abutting relation to form the legs to extend in substantially parallel side-by-side but slightly diverging relation, then cold-bending the leg ends reversely to provide a pair of hooked leg formations, then pressing a pair of opposed electrodes against said leg hook ends at the outer sides thereof so as to displace the latter together while directing an electric current to flow between said electrodes thereby initially heating the hook body and then welding the hooked leg ends together while providing beneficial heat treatment of the cold-bent portions of the stock, and then forging the welded end portion of the formed hook to provide an integral welded smooth end structure grooved along the inner surface thereof.

5. The method of forming a hook from wire-like stock comprising cutting a length of stock, then bending the latter into U-shape by ramming it intermediately of its ends between a concave die and a press block, then pressing the extending leg portions of the stock inwardly and around the press block into self-abutting relation to form the legs to extend in substantially side-by-side relation, then bending the leg ends reversely to provide a pair of open hooked leg formations, then welding the hooked leg ends together and then forging the welded end portion of the formed hook to provide a groove along the inner surface thereof, then mounting upon said formed hook a hook guard device comprising a leaf spring cantilever mounted at one end upon said hook with the opposite end of said guard spring disposed to extend exteriorly of the curve of said forged welded hook end portion, then depressing the free end of said leaf spring to within the curve of said hook end portion, and then bending said hook end portion to a further closed position with the free end of said leaf spring disposed within the grooved hook end.

ARCHIBALD L. McKINNON.

REFERENCES CITED

The following references are of record in the file of this patent:

UNITED STATES PATENTS

| Number | Name | Date |
|---|---|---|
| 261,977 | Adt | Aug. 1, 1882 |
| 448,836 | G. P. Kenehan | Mar. 24, 1891 |
| 978,656 | Schleicher | Dec. 13, 1910 |
| 1,432,615 | York | Oct. 17, 1922 |
| 1,750,142 | Weinacker | Mar. 11, 1920 |
| 2,087,204 | G. Johnson | July 13, 1937 |
| 2,313,859 | Anderson | Mar. 16, 1943 |
| 2,331,816 | Tollefson | Oct. 12, 1943 |

FOREIGN PATENTS

| Number | Country | Date |
|---|---|---|
| 149,429 | Great Britain | Aug. 13, 1920 |
| 422,301 | France | Mar. 18, 1911 |